Feb. 7, 1950        W. H. WOODWARD        2,496,613
GUARD FOR ROTARY DISKS
Filed May 30, 1944                      3 Sheets-Sheet 1
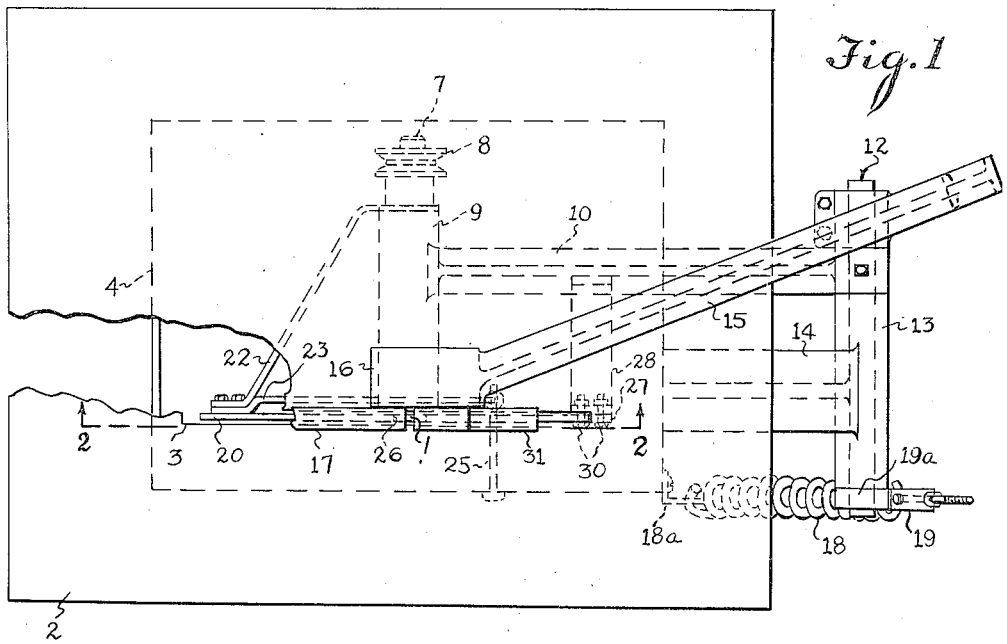
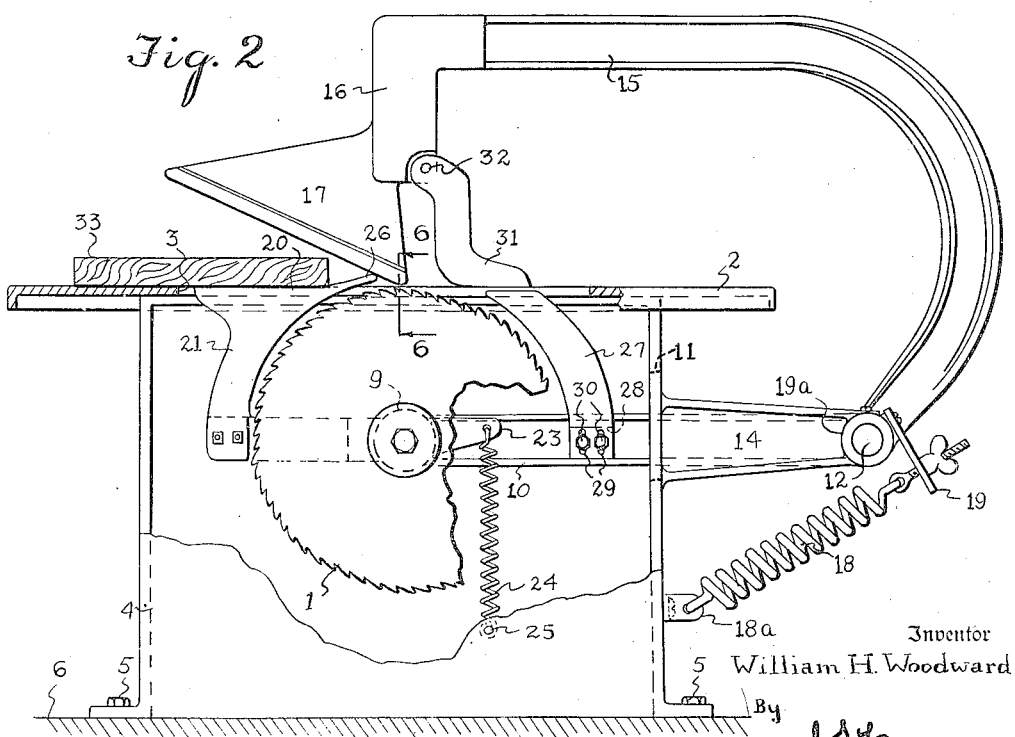
Inventor
William H. Woodward
By J S Murray
Attorney Feb. 7, 1950  W. H. WOODWARD  2,496,613
GUARD FOR ROTARY DISKS
Filed May 30, 1944  3 Sheets-Sheet 2

Inventor
William H. Woodward
By
J S Murray
Attorney

Feb. 7, 1950 — W. H. WOODWARD — 2,496,613
GUARD FOR ROTARY DISKS
Filed May 30, 1944 — 3 Sheets-Sheet 3

Inventor
William H. Woodward
By
J S Murray
Attorney

Patented Feb. 7, 1950

2,496,613

UNITED STATES PATENT OFFICE 2,496,613

GUARD FOR ROTARY DISKS

William H. Woodward, Detroit, Mich.

Application May 30, 1944, Serial No. 537,991

7 Claims. (Cl. 143—159)

This invention relates to circular saw machines and particularly guards for circular saws, and improves upon mechanism disclosed by my Patent 2,328,244, granted August 31, 1943.

An object of the invention is to so thoroughly safeguard a circular saw as to practically eliminate the possibility of an operator being cut by the saw.

Another object is to dispose a vertically movable guard for a circular saw beneath the saw table and to bias such guard upwardly so that it may be held down by pressure of work advancing to the saw and will rise immediately when cleared by the work, preventing engagement of the hand or arm of the operator with the saw.

A further object is to curve said guard conformingly to the saw periphery and to adapt it to pivot about the saw axis in its up and down movement.

A further object is to conform a guard at the rear of the saw substantially to the saw periphery and to mount such guard to move up and down through the saw table and maintain its proper relation to the saw in all working positions of the latter.

A further object is to associate with the last mentioned guard, a third guard pivotally mounted above the table and adapted to ride on the work, said guard at the rear of the saw coacting with the third guard to safeguard the latter from contact with the saw.

These and various other objects are attained by the construction hereinafter described and illustrated in the accompanying drawings, wherein:

Fig. 1 is a top plan view of the improved saw machine.

Fig. 2 is a right side view of the machine, partially in section on the line 2—2 of Fig. 1, showing a piece of work being fed toward the saw.

Figure 3:
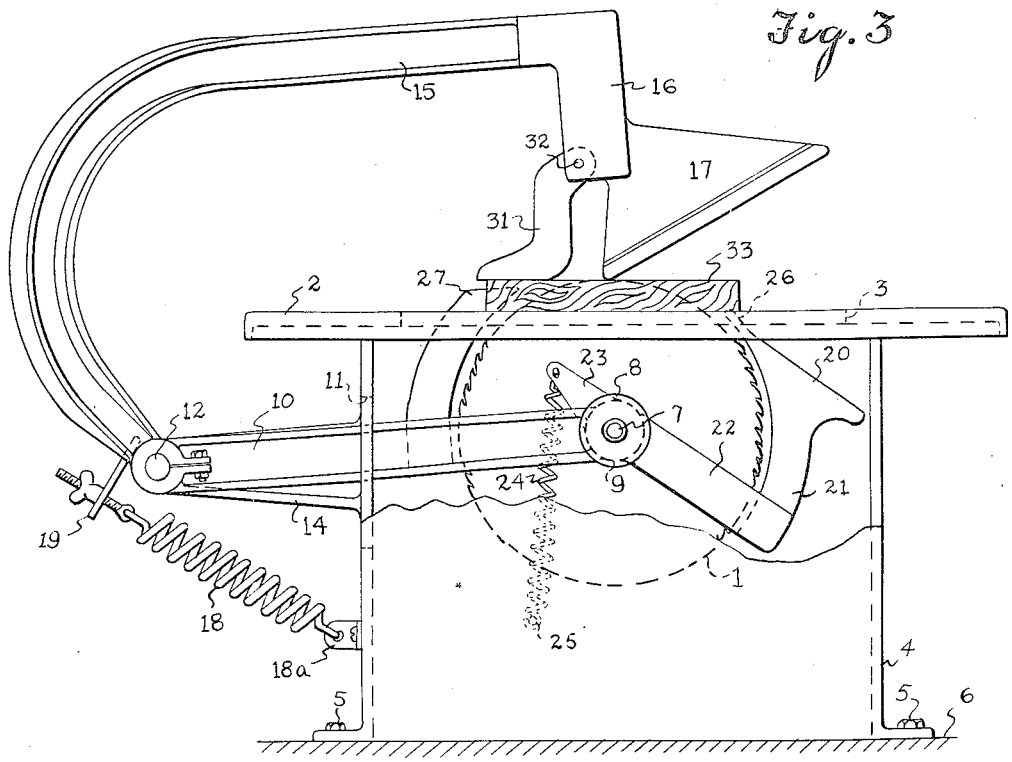
Fig. 3 is a left side view showing said work partially severed.
Figures 4, 5:
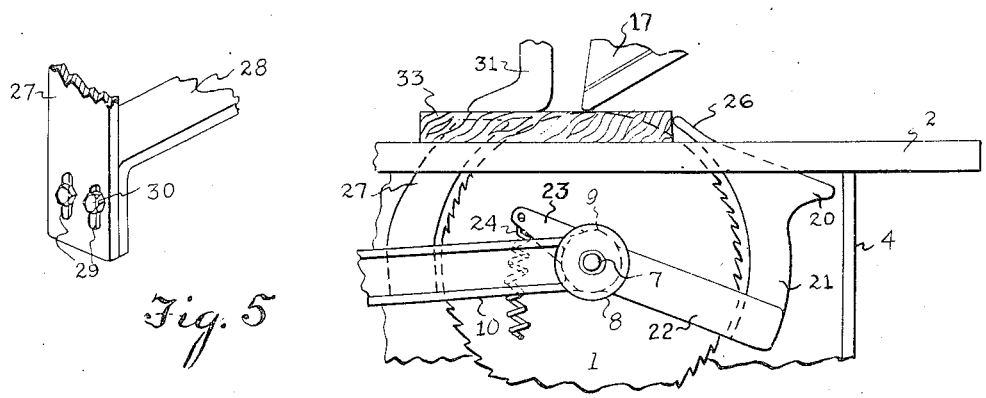
Fig. 4 is a fragmentary view, substantially duplicating a portion of Fig. 3, but showing a more advanced position of the work.
Fig. 5 is a perspective detail of the mounting of one of the saw guards.

In these views the reference character 1 designates a vertically disposed circular saw and 2 a work table having a slot 3 through which a work-engaging upper portion of the saw may project. The table surmounts and covers a rectangular saw housing 4, fastened by bolts 5 or the like to a work bench 6 or other suitable support.

The saw 1 is suitably fixed on one end of a horizontal mandrel 7, having a drive pulley 8 fixed on its other end, and an elongated bearing sleeve 9 engages the mandrel between the saw and pulley. The bearing sleeve is rigidly and preferably integrally carried by an elongated rocker arm 10 rearwardly extending from said sleeve and accommodated in a vertical slot 11 in the rear wall of the housing. Said arm is fixed at its rear end in any suitable manner on a rock shaft 12 parallel to the saw mandrel and spaced rearwardly from the housing. Said rock shaft is journaled in a sleeve bearing 13 integrally formed on the rear end of a bracket 14 rigidly and preferably integrally projecting from the housing. Upon an end portion of the rock shaft is clamped an arm 15 extending from said shaft in a rearward and upward substantially semi-circular curve and projecting forwardly from its curved portion to approach the vertical axis of the saw at an acute angle to the saw plane, as best appears in Fig. 1. It will be noted that the arms 10 and 15 together with the rock shaft 12 form a yoke pivotal about the shaft axis.

Figure 6:
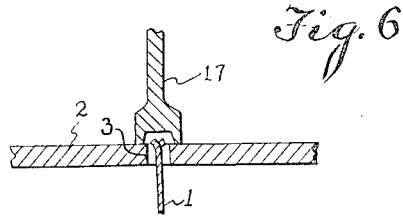
Fig. 6 is a fragmentary vertical section taken on the line 6—6 of Fig. 2, showing the relation of the saw and an overlying shoe to the table.

Formed integral with or otherwise rigidly carried by the arm 15 at its forward end is a downwardly projecting shank 16 rigidly carrying a triangular guard shoe 17 having an apex normally seating on the table 2 at a point above the saw center. Said shoe is materially wider than the saw and bisected by the central rotational plane of the saw and presents to work advancing toward the saw an edge extending forwardly and upwardly from the table-engaging apex of the shoe, such edge thus forming an acute angle with the table. Thus work advancing along the table to the saw must encounter the shoe 17 and raise the latter to a seat on such work, before the saw takes effect. The seating apex of the shoe is upwardly channeled, as best appears in Fig. 6, to assure that the saw may cut completely through the work without encountering the shoe.

As so far described, the arrangement is such that the shoe 17 is raised by the work a distance equal to the work thickness, the saw being concurrently raised the same distance, since the shoe and saw are both carried by the same rigid yoke. To reduce and nicely regulate the effort involved in raising the shoe, yoke, and saw, it is preferred to subject the yoke to a spring largely counter-balancing the gravitational turning moment of said parts. As illustrated, a coiled spring 18 is rearwardly and upwardly extended from an anchoring bracket 18a on the housing to a short arm 19 secured to and downwardly projecting from a set collar 19a fixed on the shaft 12. Obviously, other types of springs or weights might serve the same purpose. The set collar 19a further coacts with the arm 10 to restrain the shaft from endwise shifting.

As so far described, the construction is substantially that disclosed in my Patent #2,328,244 before mentioned, and my present improvements consist of additional safety features. Thus the slot 3 of the work table is elongated forwardly far enough to permit a guard having upper and lower portions 20 and 21 to work up and down through the table. Said guard is formed preferably of sheet metal, its upper and lower portions being respectively elongated lengthwise of the slot 3 and arcuately curved about the saw axis and slightly outward from the saw periphery. This guard is pivoted on the mandrel 7 by a pair of arms 22 and 23 engaging the mandrel at opposite ends of the sleeve 9, said arms converging to rigidly engage the lower end of the member 21. The arm 23 has an extension beyond the mandrel, downwardly urged by a coiled spring 24 having its lower end anchored to a horizontal pin 25 rigidly carried by the housing. Said spring urges the guard 20, 21 upwardly tending to project it through the slot 3, and response of the guard to the spring is limited by engagement with the shoe 17 of a wedge-shaped rearward extension 26 of the guard formed at the intersection of its portions 20 and 21 and having a slight upward divergency to the portion 20.

Rearward of the upper portion of the saw is disposed a substantially arcuate guard 27 disposed in the plane of the saw and having a thickness slightly less than that of the saw, such guard having its upper end slightly below the level of the uppermost saw teeth and being rigidly mounted at its lower end on an arm 28 laterally carried by the arm 10. The guard 27 is vertically slotted, as indicated at 29 for engagement by the bolts 30 which clamp said guard to the arm 28, this permitting of a slight vertical adjustment, the purpose of which is hereinafter explained.

A third guard 31 is pivoted at 32 upon the shank 16, extending rearwardly from said shank and normally resting on the saw table just above the upper end of the guard 27.

In use of the described saw machine, the shoe 17 normally rests on the table 2 and acts through the yoke comprising the arms 10 and 15 to support the saw slightly below the top face of the table. Under these conditions the guard 20, 21 is also just below the top face of the table, its extension 26 engaging the shoe 17 to maintain this position. As a board 33 or other piece of work is advanced to the saw, it first encounters and raises the shoe 17, thereby raising the saw. Presently the shoe surmounts the work, the saw in the meanwhile having penetrated the forward edge portion of the work. Continued advance of the work effects complete severing thereof, the exposure of the saw above the table being controlled by the thickness of the work, since the shoe rides on the work and controls the extent of such exposure. This assures that there will be no exposure of the saw teeth above the work in excess of the slight amount necessary to sever the work, the few exposed teeth being well guarded by the shoe 17.

The shoe 17, however, is no satisfactory safeguard against such exposure of the saw as occurs rearwardly of the work in completing a severing operation, and as best appears in Fig. 3, the guard 20, 21 avoids such exposure. The last mentioned guard is without effect when work is advancing above such guard, being held down by such work. Immediately, however, upon an advance of the work beyond its extension 26, the guard 20, 21 rises through the slot 3, following the arc of the saw, and preventing exposure of the saw teeth. Just before the work clears the shoe 17, the guard 20, 21 clears the work and establishes limiting engagement with said shoe. As the shoe drops to the table after clearing the work, it carries the guard 20, 21 down with it returning such guard to its described normal position appearing in Fig. 2.

The guard 27 is exposed above the table only when the saw is so exposed and to the same extent. When the advancing work reaches the guard 27, the latter enters the kerf and overcomes any tendency toward a contraction of the kerf while severing is being completed. This avoids such pinching of the saw by the work as would tend to kick back the work toward the operator. It is desirable that the guard 27 penetrate the kerf equally with the saw, but it should not project higher than the saw as then it would interfere with advance of the work in case the latter were not being sawed entirely through, from bottom to top. The slots 29 afford a slight downward adjustment of the guard 27, whenever this may become necessary in compensation for filing of the saw teeth. It is here to be understood that the arms 10 and 15 may be adjusted relatively on the rock shaft 12 to increasingly space the saw and shoe 17 when it is desired to cut only partially through a piece of work.

The guard 31 normally rests on the table but is raised when the saw is raised and to substantially the same extent, due to supporting effect exercised by the guard 27. Jointly, the guards 27 and 31 fully cover such saw teeth as are exposed during a sawing operation rearwardly of the vertical plane of the saw mandrel. As the work advances under the guard 31, the latter is slightly raised to ride upon the work, and drops of its own weight when the work has passed.

The described guard arrangement achieves a maximum of safety, the guards automatically adjusting themselves to the work and entailing no special skill or training in use of the saw and no retardation of sawing operations. A feature of the construction is that the tension of the spring 24 is increased proportionately to the raising of the saw. This is desirable since the extent of downward tilting of the guard 20, 21 and its supporting arms 22 and 23 is proportionate to raising of the saw and such tilting tends to shorten the effective leverage exerted by the spring 24. The shortening of leverage is compensated for by the increased tension of the spring, so that a substantially constant effect is derived from the spring in the various positions of the saw.

Figure 7:
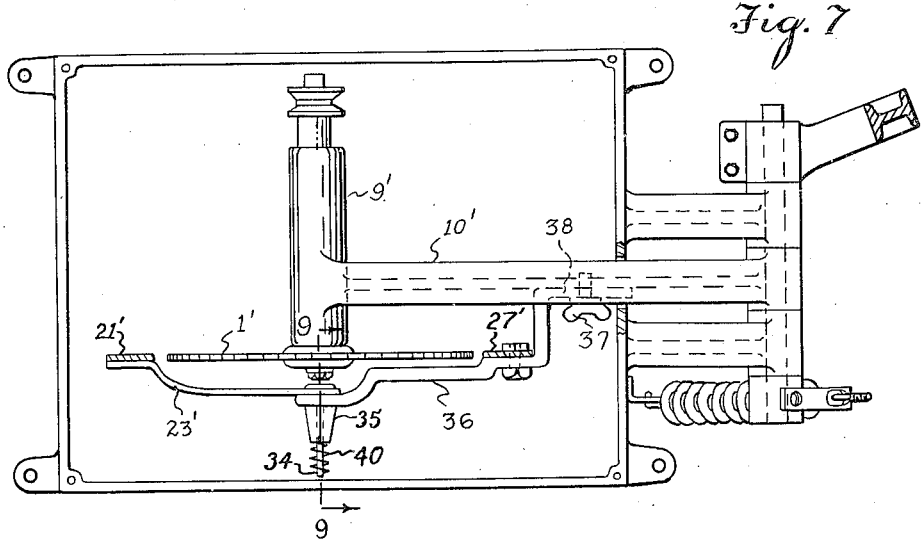
Fig. 7 is a top plan view of the machine in a modified form, with the work table removed.
Figure 8:
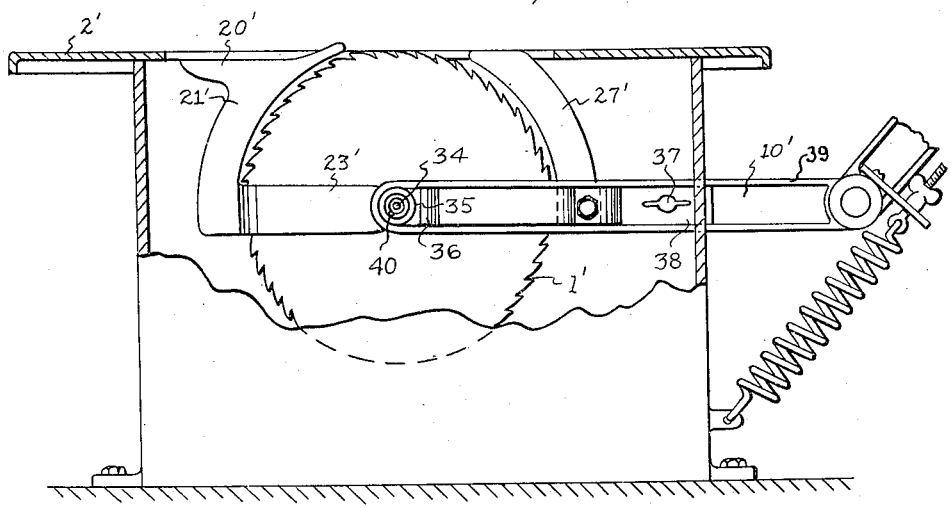
Fig. 8 is a side elevational view of the modified construction, partially in section.
Figure 9:
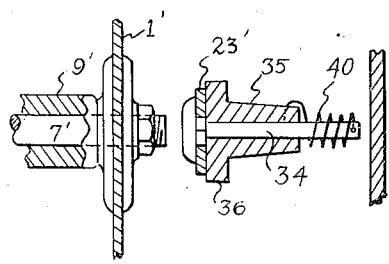
Fig. 9 is a sectional detail on the line 9—9 of Fig. 7.

In the modified construction shown in Figs. 7, 8 and 9, the guard 20', 21', positioned in front of the saw 1' is rigidly mounted upon and preferably integral with a single supporting arm 23', radial to the saw. Fixed upon the arm 23' is a pin 34 aligned with the saw mandrel 7' adjacent to the saw-supporting end of such mandrel. Said pin is journaled in a bearing 35 formed on the front end of an elongated arm 36 extending to the rear of the saw and there rigidly mounting the guard 27' such as is used in the first described construction. The arm 36 is then extended to the rocker arm 10' which supports the mandrel bearing sleeve 9', being clamped to such rocker arm by a thumb screw 37. A rigid connection between the arm 36 and rocker arm 10' is assured by fitting a base portion 38 of the arm 36 snugly between upper and lower ribs 39 formed on the rocker arm. To yieldably urge the guard 20', 21' upwardly about the pin 34, a torsion spring 40 is mounted on the outer end portion of said pin, reacting between the pin and the bearing 35.

As thus modified, the construction has the advantage that the guards 20', 21' and 27' form an assembly unit with the arm 36, which unit may be much more easily installed or removed than is true of the first described guards. If for any reason it is desired to use the machine without said guards, it is necessary only to loosen the thumb screw 37 to permit removal of the assembly unit.

It is to be noted that my improved guard provision is applicable to abrasive cutting disks as well as to circular saws, it being very vital to safeguard such disks, since they are subject to breakage and may cause injury through flying fragments as well as by cutting.

What I claim is:

1. A rotary cutting disk machine comprising a rotary cutting disk, a table for supporting work fed to the disk, the axis of disk rotation being below the table level and the disk extending peripherally above said level to engage the work, a guard disposed in advance of the disk and normally positioned substantially below the work-supporting surface of the table, whereby the work rides over said guard in approaching the disk, means urging said guard upwardly, whereby it rises immediately behind advancing work, and an element disposed above said table, a mounting for said element affording it an up and down travel such as to gravitationally dispose said element at the lower limit of such travel in the path of work advancing to the disk and also in the path of upward travel of said guard, said element being upwardly displaceable by advancing work, whereby said element in its lower limiting position limits upward travel of the guard, but is raised by the work to permit the guard to rise behind the work.

2. In a rotary cutting disk machine as set forth in claim 1, means for raising and lowering the disk to vary the extent of its exposure above the table, said means urging the guard upwardly being a tension spring, and an anchorage for said spring, fixed with reference to the up and down movement of the disk.

3. In a rotary cutting disk machine, the combination with a rotary cutting disk and a table for supporting work fed to the disk, the disk being normally disposed substantially in its entirety below the work surface of the table, of a control element normally in the path of work advancing to the disk and movable by the work to clear said path, a connection from said element to the disk for raising the disk proportionately to the movement of said element, whereby the extent of exposure of the disk above the table is regulated by the actuation of said element, a guard disposed in advance of the disk and normally positioned below said work surface, whereby the work rides over said guard in approaching the disk, means urging the guard upwardly whereby it rises immediately behind advancing work, said control element being disposed in the path of upward travel of the guard and thus limiting response of the guard to said urging means.

4. In a rotary cutting disk machine, the combination with a rotary cutting disk and a table for supporting work fed to the disk, the axis of disk rotation being below the table level and the disk extending peripherally above said level to engage the work, a guard disposed in advance of the disk adjacent to the disk periphery, means carrying said guard and adapting it to swing substantially about the axis of the disk, an arm substantially radial to the disk axis and effective on the last-named means to swing said guard about said axis, a coiled spring effective on said arm to urge said guard upwardly, said spring extending to a material degree downwardly from the arm, an element normally limiting upward response of said guard to the spring, said element being engageable and movable by advancing work to increase such response, means for raising and lowering the disk to regulate its exposure above the table, and an anchorage for said spring fixed with relation to the raising and lowering of the disk, whereby said spring is increasingly tensioned as its effective leverage is decreased due to swinging of said arm incident to raising of the disk.

5. A rotary cutting disk machine comprising a rotary cutting disk, a table for supporting work fed to the disk, the axis of disk rotation being below the table level and the disk extending peripherally above such level to engage the work, a support for the disk movable up and down to regulate exposure of the disk above the level of the table, a guard disposed in advance of the disk and normally positioned substantially below the work supporting surface of the table, whereby the work rides over said guard in approaching the disk, a support for the guard removably carried by the first mentioned support solely at one side of the plane of the disk and remote from the disk axis and extending to the disk axis at the other side of the plane of the disk, a member rigidly carrying the guard, means pivoting said member on the guard support substantially coaxially with the disk, and means yieldably urging the guard-carrying member upwardly about its pivotal axis.

6. In a rotary cutting disk machine as set forth in claim 5, a guard carried by said removable support and upwardly extending at the rear of the disk adjacent to the disk periphery.

7. In a rotary cutting disk machine, the combination with a rotary cutting disk, a support for work advancing to said disk, a guard positioned to underlie work advancing to the disk, means pivoting said guard substantially at the disk axis for up and down movement, means yieldably urging said guard upwardly whereby it may be pressed upwardly against work being fed to the disk, and a second guard for the disk disposed substantially in its entirety above said support and having a position in the path of work advancing on the support and also in the path of upward travel of the first-mentioned guard and effective in such position to limit upward actuation of the first mentioned guard, said second guard being upwardly bodily movable by advancing work to clear the first mentioned guard, whereby the first mentioned guard may rise behind advancing work.

WILLIAM H. WOODWARD.

REFERENCES CITED

The following references are of record in the file of this patent:

UNITED STATES PATENTS

| Number | Name | Date |
|---|---|---|
| 869,513 | Pfeil | Oct. 29, 1907 |
| 1,228,047 | Reinhold | May 29, 1917 |
| 1,241,588 | Wallace | Oct. 2, 1917 |
| 1,427,005 | McMichael | Aug. 22, 1922 |
| 1,464,924 | Drummond | Aug. 14, 1923 |
| 1,623,290 | Wappat | Apr. 5, 1927 |
| 1,701,948 | Crowe | Feb. 12, 1929 |
| 1,711,490 | Drummond | May 7, 1929 |
| 1,942,766 | O'Banion | Jan. 9, 1934 |
| 2,328,244 | Woodward | Aug. 31, 1943 |